(12) United States Patent
Jeong

(10) Patent No.: US 9,116,618 B2
(45) Date of Patent: Aug. 25, 2015

(54) TERMINAL HAVING TOUCH SCREEN AND METHOD FOR DISPLAYING KEY ON TERMINAL

(75) Inventor: Hyun Seok Jeong, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 310 days.

(21) Appl. No.: 13/472,647

(22) Filed: May 16, 2012

(65) Prior Publication Data

US 2012/0306754 A1 Dec. 6, 2012

(30) Foreign Application Priority Data

Jun. 2, 2011 (KR) ........................ 10-2011-0053432

(51) Int. Cl.
*G09G 5/00* (2006.01)
*G06F 3/0488* (2013.01)
(52) U.S. Cl.
CPC .................................. *G06F 3/04886* (2013.01)
(58) Field of Classification Search
CPC ............ G06F 3/04886; G06F 3/04895; G06F 3/04883; G06F 3/0236; G06F 3/0238; G06F 3/0481

USPC ................................. 345/156, 157, 173–178; 178/18.01–18.06; 455/556.1, 556.2, 455/566; 715/773

See application file for complete search history.

(56) References Cited

U.S. PATENT DOCUMENTS

| | | | |
|---|---|---|---|
| 2008/0158020 A1* | 7/2008 | Griffin | 341/22 |
| 2011/0221693 A1* | 9/2011 | Miyazaki | 345/173 |
| 2011/0264442 A1* | 10/2011 | Huang et al. | 704/9 |
| 2012/0062465 A1* | 3/2012 | Spetalnick | 345/168 |

* cited by examiner

*Primary Examiner* — Jennifer Nguyen
(74) *Attorney, Agent, or Firm* — Jefferson IP Law, LLP

(57) ABSTRACT

A terminal having a touch screen and a method for displaying a key corresponding to an area in which an input event by a user is detected on the terminal are provided. The method includes in a character input mode, determining whether a touch event is detected in a key display area including at least one key area, when the touch event is detected, confirming a key area of the key display area in which the touch event is detected, and displaying a key recognition item on the key area.

18 Claims, 6 Drawing Sheets

TERMINAL HAVING TOUCH SCREEN AND METHOD FOR DISPLAYING KEY ON TERMINAL

PRIORITY

This application claims the benefit under 35 U.S.C. §119(a) of a Korean patent application filed on Jun. 2, 2011 in the Korean Intellectual Property Office and assigned Serial No. 10-2011-0053432, the entire disclosure of which is hereby incorporated by reference.

BACKGROUND OF THE INVENTION

1. Field of the Invention

The present invention relates to a terminal having a touch screen and a method for displaying keys on a terminal. More particularly, the present invention relates to a method for displaying a key corresponding to an area in which an input event by a user is detected on a terminal having a touch screen.

2. Description of the Related Art

A touch screen typically includes a touch sensor attached on a display for performing an input function. The touch screen may be included in a small terminal. The reason why the touch screen is used as an input apparatus for selecting a menu in small terminals is that input is convenient and there is a limited space for a separate input unit in a small terminal.

Various types of terminals having touch screens have been provided to satisfy consumer demands. A portable terminal and tablet PC are prominent cases. Many people have used these terminals because these terminals are easy to carry and it is possible to immediately confirm desired data.

Typically, a terminal having a touch screen displays a plurality of keys for inputting characters on the touch screen. A user may input desired characters to the terminal by touching keys displayed on the touch screen.

A touch screen is divided into a character display area for displaying input characters and a key display area for displaying keys. As a result, it is difficult for a user to determine whether a character displayed in the character display area coincides with a key selected in the key display area. Similarly, when input contents such as a password input are not shown on a display for security, the user may immediately recognize whether a character is correctly inputted or not. In addition, because keys displayed on a touch screen of a small terminal tend to be small, the user very often pushes a wrong button.

SUMMARY OF THE INVENTION

Aspects of the present invention are to address at least the above-mentioned problems and/or disadvantages and to provide at least the advantages described below. Accordingly, an aspect of the present invention is to provide a terminal having a touch screen and a method for displaying a key by which a key can be confirmed according to an input by a user on the terminal.

In accordance with an aspect of the present invention, a method for displaying a key is provided. The method includes in a character input mode, determining whether a touch event is detected in a key display area including at least one key area, when the touch event is detected, confirming a key area of the key display area in which the touch event is detected, and displaying a key recognition item on the key area.

In accordance with another aspect of the present invention, a key display apparatus is provided. The apparatus includes a touch screen including a touch sensor for detecting a touch event, and a display unit for displaying a key display area including at least one key area and a character display area for displaying a character mapped onto the key area according to a detected touch event, and a controller for, in a character input mode, when a touch event is detected in the key display area through the touch screen, confirming a key area in which the touch event is detected and for controlling the display unit to enable the display unit to display a key recognition item in the key area.

In accordance with another aspect of the present invention, a mobile terminal is provided. The mobile terminal includes a display unit for displaying a screen including a character display area and a key display area having a plurality of key areas, each key area corresponding to a key, a touch screen coupled to the display unit for receiving a user's touch input selecting one of the key areas, and a controller for identifying a key area in which a touch input is detected by the touch screen, for controlling the display unit to display a character corresponding to the key area in the character display window, and for controlling the display unit to distinguish the key area from other key areas of the key display area.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the term 'terminal' denotes an information processing apparatus which can process data transmitted to or received from an external source. The terminal can store various types of data. The terminal may be a computer, a notebook, a tablet PC, and a portable terminal The exemplary terminal described herein is a smart phone.

The term 'key recognition item' denotes an item for distinguishing a selected key area among key areas displayed on a touch screen from any other key areas non-selected. The key recognition item includes a color varied item, a numeral item, and a block item. The key recognition item is displayed in a selected key area among the plurality of key areas displayed in a key display area.

The term 'character input mode' denotes a mode for inputting data through at least one key denoted on a touch screen. The character input mode includes a message transmitting mode in which a message may be input to be transmitted to a counterpart terminal, a word-processing mode in which a character for word-processing may be input, a numeral input mode in which numerals such as a telephone number may be input, a password input mode in which a password for security may be input, and a searching mode in which data are searched through Internet.

Figure 1:
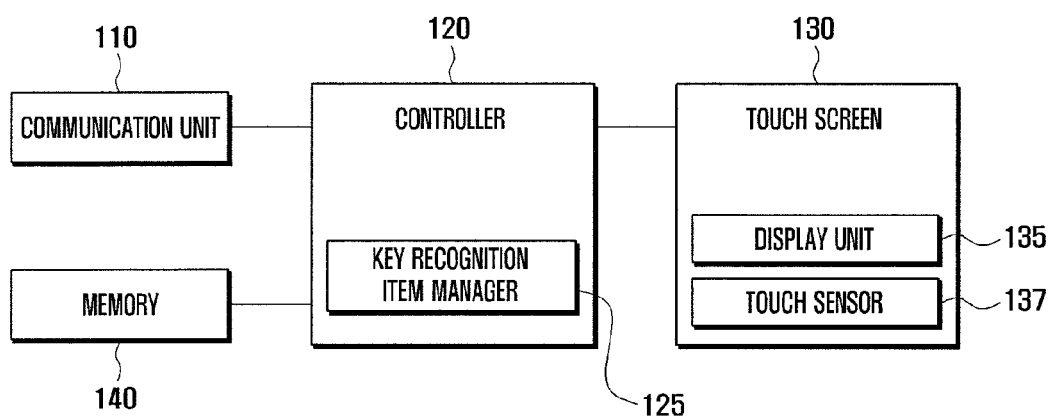
FIG. 1 is a block diagram illustrating a terminal according to an exemplary embodiment of the present invention.

FIG. 1 is a block diagram illustrating a terminal according to an exemplary embodiment of the present invention.

Referring to FIG. 1, the terminal includes a communication unit 110, a controller 120, a touch screen 130, and a memory 140.

The communication unit 110 performs a communication function between the terminal and a base station. The communication unit 110 forms a communication channel with the base station to perform data communication such as a short message or an image, voice communication, and visual communication. The communication unit 110 may include an RF transmitting unit for up-converting and amplifying a frequency of a transmitting signal, and an RF receiving unit for low noise amplifying a received signal and for down-converting its frequency. In addition, the communication unit 110 may perform local communication with an external terminal to transmit and receive data.

The controller 120 controls overall operations and states of components of the terminal In a character input mode, the controller 120 controls the display unit 135 such that the display unit 135 is compartmentalized into a key display area including at least one key area mapped onto a character and a character display area for displaying a character mapped onto a key area selected in the key display area.

The controller 120 controls the display unit 135 such that a key recognition item is displayed on the key display area in which a touch event is detected through the touch screen 130. The controller 120 may include a key recognition item manager for this purpose.

The key recognition item manager controls the display unit 135 such that the key recognition item is displayed on the key area of the key display area in which the touch event is detected. The key recognition item is an item displayed for distinguishing the key area in which the touch event is detected from the other key areas of the key display area. The key recognition item manager 125 performs a character input mode in which a character or numeral may be inputted according to the touch event that is detected through the touch screen 130 according to a selection by a user. The character input mode may be a message transmitting mode, a word-processing mode, a password input mode, etc. Characters mapped onto the key areas include characters of various languages, such as Korean, English, Japanese, etc., and special characters such as symbols.

The key recognition item manager 125 determines whether the touch event is detected in the touch display area through the touch screen 130. If the touch event is detected, the key recognition item manager 125 confirms which key area the touch event is detected in. The key recognition item manager 125 enables the key recognition item to be displayed in the confirmed key area. The key recognition item manager 125 may enable the key recognition item that corresponds to an order or the number of times of detecting touch events in a corresponding key area to be displayed.

The key recognition item may be a color varied item for varying a color of the key area in which the touch event is detected. The key recognition item may be a numeral item which can display a numeral in the key area in the order of detecting the touch event. The key recognition item may be a block item which can display the key area in which the touch event is detected as a block. In addition, a selected key area may be displayed as a highlight.

The key recognition item manager 125 determines whether a character input mode end is selected. If the character input mode end is selected, the key recognition item manager 125 performs a function corresponding to an inputted character. The key recognition item manager 125 resets the key recognition item displayed in the key display area. In a next character input mode, a key recognition item may be newly displayed.

The touch screen 130 includes a display unit 135 and a touch sensor 137 arranged at one side of the display unit 135. The display unit 135 displays information input by or provided to a user as well as various menus of the terminal The display unit 135 may be manufactured with a Liquid Crystal Display (LCD). The screen of the display unit 135 is divided into a character display area for displaying a character input to one screen and a key display area having at least one key area through which a displayed character may be selected, under a control of the controller 120. The display unit 135 displays the key recognition item in the key display area in which the touch event is detected, under the control of the controller 120. In the character input mode and under the control of the controller 120, the display unit 135 displays in the character display area, a character or numeral mapped onto the key area in which of the key display area the touch event is detected.

The touch sensor 137 is attached to one side of the display unit 135 and detects the touch event generated on a surface of the display unit 135. The touch sensor 137 may detect a coordinate, namely a position value, of an area in which a touch event is generated. The detected position value is transferred to the controller 120, such that the controller 120 confirms the key area in which the touch event is detected through the position value. The touch sensor 137 may be implemented in various types, such a capacitive type, an ultrasonic type, an optical sensor, an electromagnetic induction type, etc.

The memory 140 stores programs needed for operations of components of the terminal and data generated by them under the control of the controller 120. The memory 140 stores information about the key recognition item displayed in the key area under the control of the controller 120. For example, the memory 140 may store information about a color varied item which is varied according to the number of times the touch event is detected, a numeral item displayed according to an order in which the touch event is detected in the key area, etc. The memory 140 may also store information about the order or the number of times the touch event is detected in the key area in the character input mode, under the control of the controller 120.

Although not depicted in the drawings, the terminal may further include various components according to functions to be performed. For example, the terminal may further include a camera unit for photographing an image, a digital broadcasting receiver for receiving digital broadcasting data, and an audio processing unit for processing voice data, audio data, etc.

In the character input mode, the terminal may display the key recognition item in the key display area according to the order or the number of times the touch event is detected through the touch screen 130. Thus, the user may intuitively confirm which key is selected.

Figure 2:
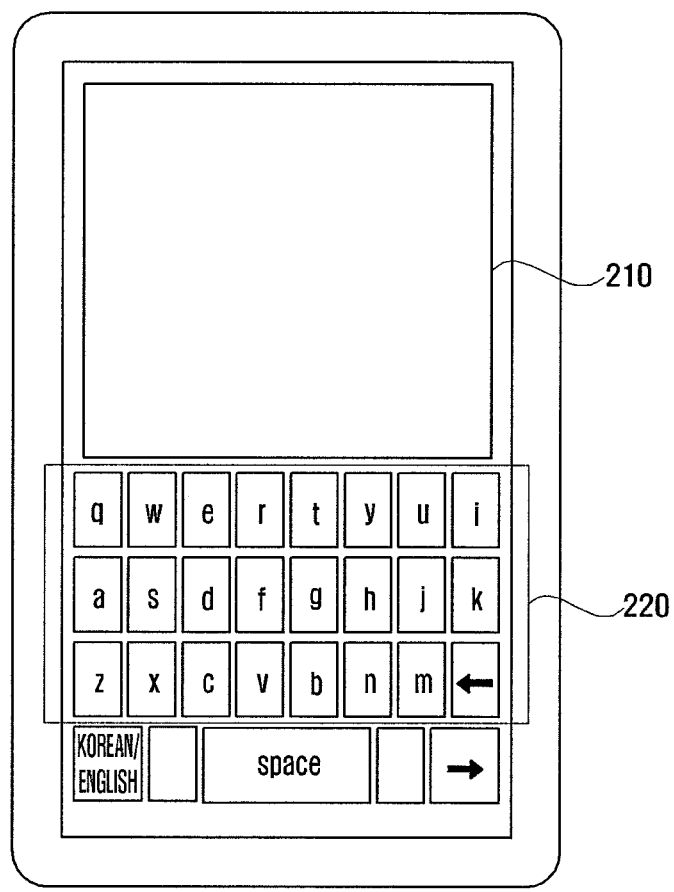
FIG. 2 shows a picture of a touch screen according to an exemplary embodiment of the present invention.

FIG. 2 shows a picture of a touch screen according to an exemplary embodiment of the present invention.

Referring to FIG. 2, the display unit 135 of the terminal is divided into the character display area 210 in which a character is displayed and the key display area 220 onto which a character displayed in the character display area 210 is mapped. The key display area 220 includes at least one key area mapped onto a character or numeral. Although it is depicted in FIG. 2 that the at least one key area mapped onto English alphabet is included in the key display area 220, exemplary embodiments of the present invention are not limited thereto. According to the character input mode and/or a setting by a manufacture company, the key area may be mapped onto the Korean alphabet, the English alphabet, numerals, special characters such as symbols, etc.

Exemplary embodiments of the present invention present a method of displaying a key recognition item in a key area in which a touch event is detected to be distinguished from any keys which are not selected in the key area. The key recognition item may include a color varied item which is varied in its color and displayed to enable a color of the selected key area to be distinguished from non-selected key areas, and a numeral item displayed in the selected key area in an order in which the touch event is detected.

Figure 3:
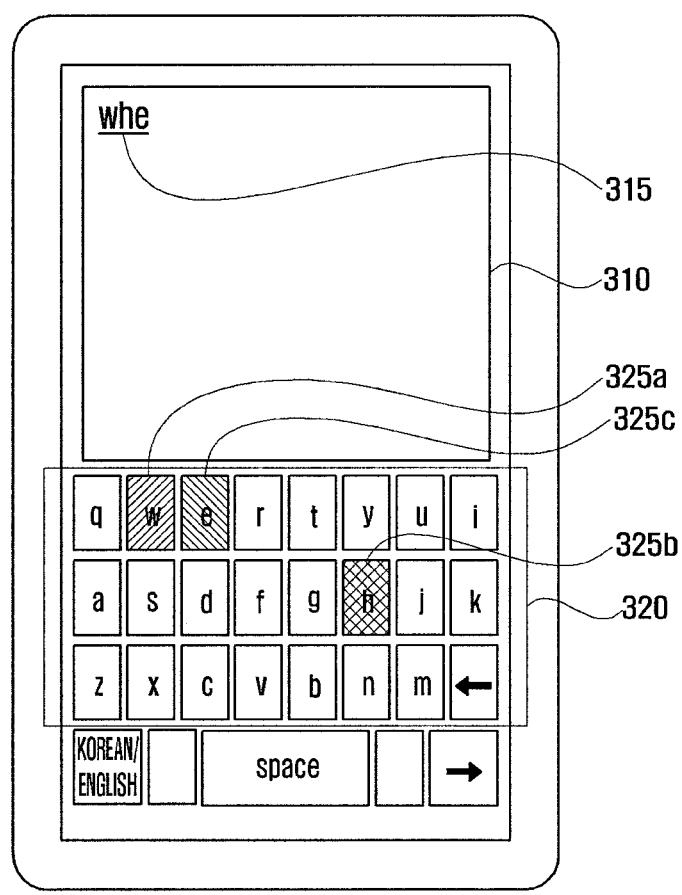
FIG. 3 shows a screen displaying a key recognition item according to a touch event according to an exemplary embodiment of the present invention.

FIG. 3 is a view for showing a screen of displaying a key recognition item according to a touch event according to an exemplary embodiment of the present invention.

Referring to FIG. 3, in the character input mode, the display unit 135 may display a character mapped onto a key area in which a touch event is detected on a character display area 310 under the control of the controller 120. The display unit 135 may display a color varied item in a key area of the key display area 320 in which a touch event is detected, under the control of the controller 120. FIG. 3 shows an example of the character input mode in which the character input mode is a message writing mode.

For inputting a word 'whe', a user in turn touches key areas mapped onto 'w', 'h', and 'e' in the key display area in the inputting order. The controller 120 in turn confirms key areas in which the touch events are detected through the touch screen 130. The touch event detected key areas are the key areas mapped onto 'w', 'h' and 'e' in the key display area. The controller 120 controls the display unit 135 such that the word 'whe' 315 is displayed in the touch event detecting order. The controller 120 controls the display unit 135 such that color varied items are displayed in the key areas 325*a*, 325*b* and 325*c* mapped onto 'w', 'h' and 'e' in the key display area. The controller 120 also controls the display unit 135 such that the color varied items have different colors to distinguish the touch event detected key areas from one another.

The foregoing exemplary embodiment has illustrated that the controller 120 controls the display unit 135 such that the color varied item is displayed to be overlaid on the corresponding key area. However, the controller 120 may control the display unit 135 such that the background color of the key area are varied according to the detected touch event. The controller 120 controls the display unit 135 such that the color of the key area may be varied according to the number of times of the detected touch events. For example, a color of a key area may be displayed in red if the touch event occurs once in the key area, orange if twice, and yellow if three times. If it is detected that the touch event occurs twice, the controller 120 enables the particular key area to be displayed in orange. Accordingly, a user may recognize that a character corresponding to the particular key area is input more than two times.

Figure 4:
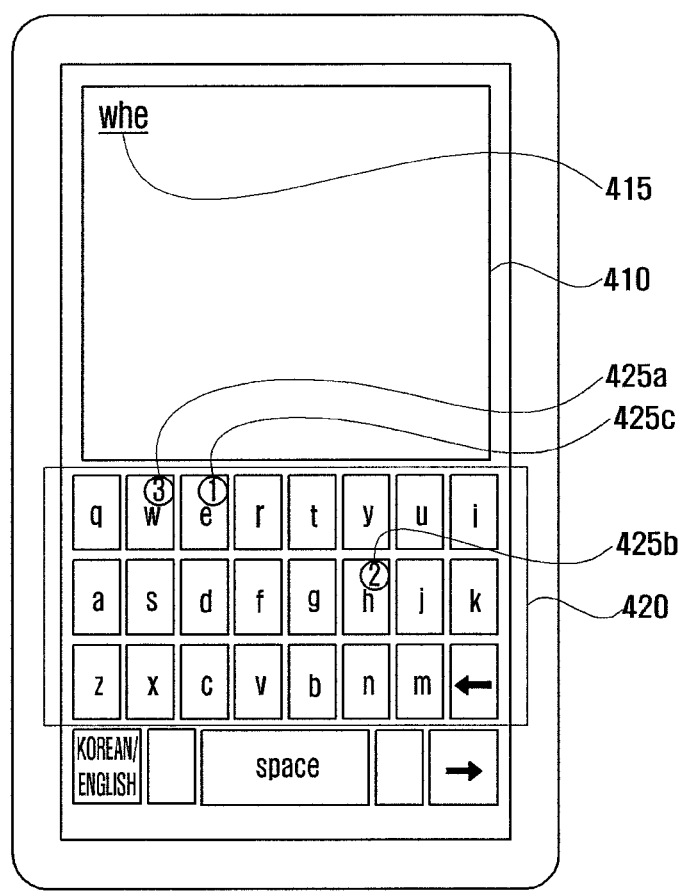
FIG. 4 shows a screen displaying a key recognition item according to a touch event according to an exemplary embodiment of the present invention.

FIG. 4 shows a screen displaying a key recognition item according to a touch event according to an exemplary embodiment of the present invention.

Referring to FIG. 4, in the character input mode, the display unit 135 may display a character mapped onto a key area in which a touch event is detected on a character display area 410 under the control of the controller 120. The display unit 135 may display a numeral item in a key area of the key display area 420 in which a touch event is detected, in the order of the detected touch events under the control of the controller 120. FIG. 4 shows an example of the character input mode in which the character input mode is a message writing mode.

For inputting a word, 'whe', a user touches key areas mapped onto 'w', 'h', and 'e' in the key display area in the inputting order. The controller 120 confirms key areas in the order of the detected touch events through the touch screen 130. The touch event detected key areas are the key areas mapped onto 'w', 'h' and 'e' in the key display area.

The controller 120 controls the display unit 135 such that the word 'whe' 415 is displayed in the character display area 410 in the touch event detecting order. The controller 120 controls the display unit 135 such that numeral items are displayed in the key areas based on the most recent order of the detected touch events. The controller 120 controls the display unit 135 such that the numeral '3' 425*a*, numeral '2' 425*b* and numeral '1' 425*c* are in turn displayed in the key areas mapped onto 'w', 'h' and 'e' in the key display area 420. The character 'e' of the word 'whe' is lastly inputted in the inputting order. Accordingly, the controller 120 controls the display unit 135 such that the numeral '1' is displayed in the key area mapped onto the lastly input character 'e'.

The controller 120 controls the display unit 135 such that a numeral item may be displayed in a key area in the touch event detected order. The controller 120 controls the display unit 135 such that the numerals '1', '2' and '3' may be displayed in the key areas mapped onto the characters 'w', 'h', and 'e' in the touch event detected order.

The controller 120 confirms the number of times of the detected touch events in corresponding key areas in order to display numeral items. The controller 120 may display the numeral items according to the confirmed number of times. All numeral items which correspond to the detected order of the touch events may be displayed, or only a last numeral item which corresponds to the last of the detected order may be displayed.

Figure 5:
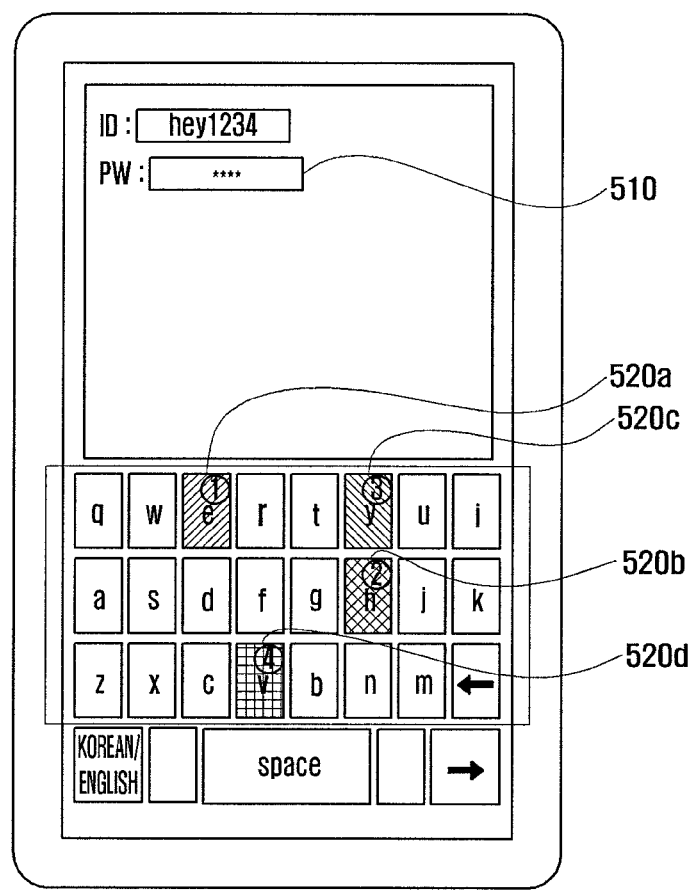
FIG. 5 shows a screen displaying a key recognition item according to a touch event according to an exemplary embodiment of the present invention.

FIG. 5 shows a screen of a key recognition item according to a touch event according to an exemplary embodiment of the present invention.

Referring to FIG. 5, the display unit 135 may display a character mapped onto a key area in which a touch event is detected in a character display area under the control of the controller 120. The display unit 135 may display a color varied item and a numeral item of a key recognition item in a key area in which of the key display area a touch event is detected, in the order of the detected touch events under the control of the controller 120. FIG. 5 shows an example of the character input mode in which the character input mode is a password input mode.

For inputting a password, it is assumed that a user in turn touches key areas mapped onto 'e', 'h', 'y' and V. The controller 120 controls the display unit 135 such that the password 'ehyv' mapped onto the key areas in which the touch events are detected is displayed in a password input window 510 of the character display area. The controller 120 controls the display unit 135 such that special characters such as '****' are displayed as 'ehyv'. The controller 120 controls the display unit 135 such that the numeral 1 is displayed in a key area 520a onto which 'e' is mapped, the numeral 2 is displayed in a key area 520b onto which 'h' is mapped, the numeral 3 is displayed in a key area 520c onto which 'y' is mapped, and the numeral 4 is displayed in a key area 520d onto which 'v' is mapped, in the detecting order of the touch events. The controller 120 controls the display unit 135 such that a color varied item is displayed in the key areas 520a, 520b, 520c, and 520d onto which the characters 'e', 'h', 'y' and 'v' are mapped, respectively.

Figure 6:
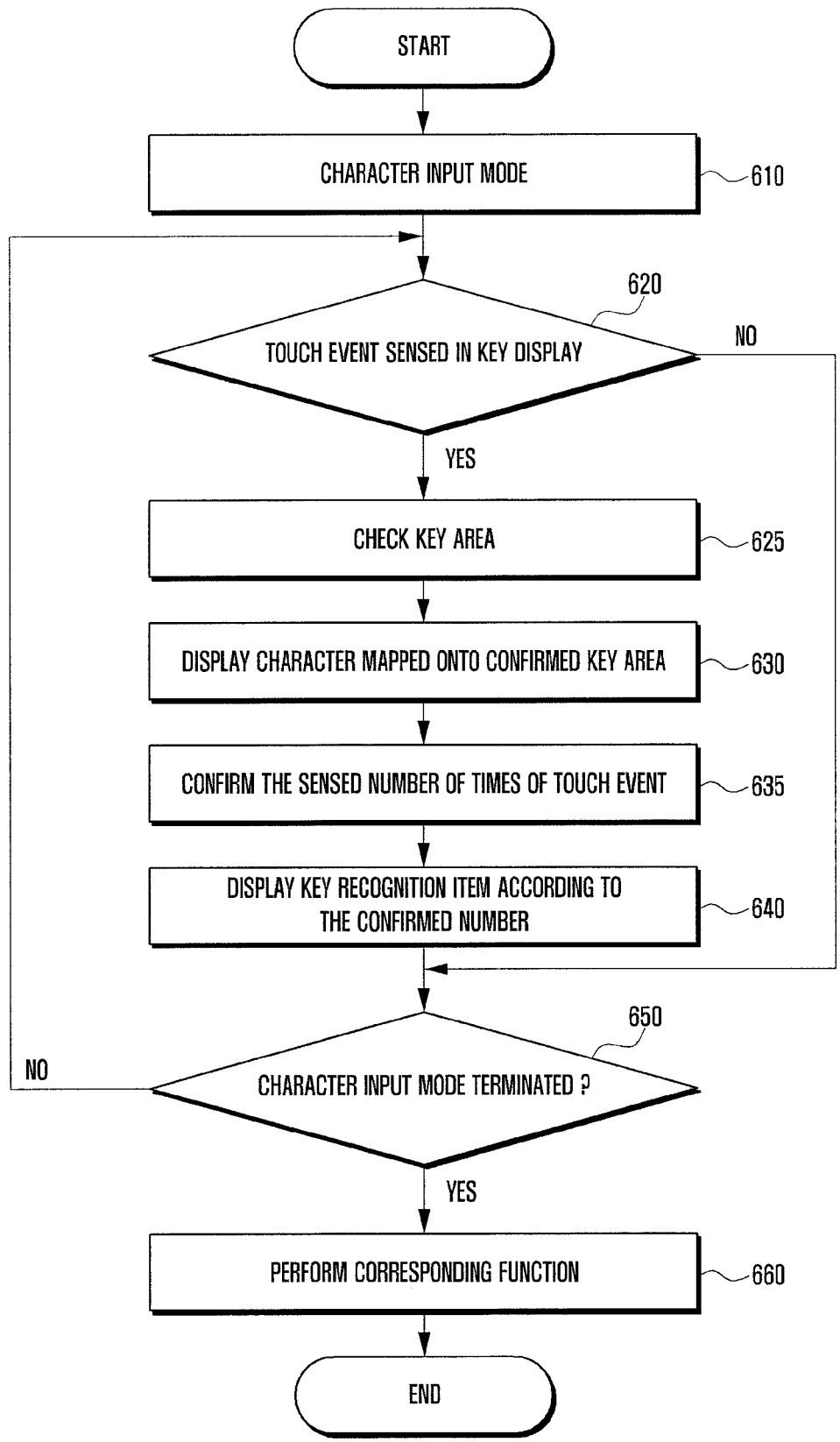
FIG. 6 is a flowchart illustrating a method of displaying a key recognition item according to an exemplary embodiment of the present invention.

FIG. 6 is a flowchart illustrating a method of displaying a key recognition item according to an exemplary embodiment of the present invention.

Referring to FIG. 6, the controller 120 performs the character input mode in which a character or numeral can be input according to a touch event detected through the touch screen 130 in step 610. The controller 120 divides the display screen of the display unit 135 into the key display area including at least one key area for inputting a character or numeral and the character display area for displaying a character or numeral mapped onto a key area in the key display area when the key area is selected. The character input mode may include a message transmitting mode, a word-processing mode, and a password input mode. The characters mapped onto the key areas includes characters of languages such as Korean, English, Japanese, etc., and special characters such as symbols, etc.

The controller 120 determines whether a touch event is detected in the key display area in step 620. If a touch event is detected, the controller identifies a key area of the key areas included in the key display area in which the touch event is detected in step 625. At the same time, the controller 120 also confirms which character is mapped onto the touch detected key area. The controller 120 enables the character mapped onto the confirmed key area to be displayed in the character display area in step 630.

The controller 120 confirms how many times the touch event is detected in the confirmed key area in step 635. The controller 120 controls the display unit 135 such that a key recognition item is displayed according to the confirmed number of times of touching of the key area in step 640. The controller 120 controls the display unit 135 such that the key recognition item may be displayed in the detecting order of the touch events in the key area. The key recognition item may be a color varied item which varies a color of the touch event detected key to enable that to be distinguished from other key areas in the key display area. The key recognition item may be a numeral item which denotes the detecting order of the touch event as a numeral in the key area. The key recognition item may be a block item which denotes the selected key area as a block. In addition, the selected key area may be denoted as a highlight.

The controller 120 determines whether a termination of the character input mode is selected in step 650. If the termination of the character input mode is selected, the controller 120 performs a function corresponding to the input character in step 660. The controller 120 resets the key recognition item displayed in the key display area. When the character input mode starts again, a new key recognition item may be displayed in the key display area. If the character input mode is the message transmitting mode, the input character may be transmitted to a counterpart terminal by its function. If the character input mode is the word-processing mode, its function may be a function of storing a created document.

Through the above mentioned process, a key area selected by a user is distinguished from other non-selected key areas. Accordingly, the user may recognize which key is selected by the user and confirm which character is input.

According to exemplary embodiments of the present invention, a user may rapidly input characters or numerals using keys displayed on a touch screen of a terminal In addition, a user can easily confirm keys corresponding to input characters. A user may instinctively recognize a character or numeral denoted in a character display area through keys displayed on a touch screen.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of displaying a key, the method comprising:
   in a character input mode, determining whether a touch event is detected in a key display area including at least one key area;
   when the touch event is detected, confirming a key area of the key display area in which the touch event is detected; and
   displaying a key recognition item on the key area,
   wherein the displaying of the key recognition item comprises displaying the key recognition item on the key area according to an order or a number of times of the detected touch event.

2. The method of claim 1, wherein the displaying of the key recognition item comprises displaying at least one of a color varied item, a numeral item, and a block item on the key area.

3. The method of claim 1, wherein the key recognition item is displayed such that the key recognition item is distinguished from other key areas of the key display area.

4. The method of claim 3, further comprising:
   when the character input mode is a password input mode, displaying special characters as characters on the character display area.

5. The method of claim 1, further comprising:
   when the character input mode is over, resetting the key recognition item.

6. The method of claim 1, wherein the key area is mapped onto at least one of characters or numerals.

7. The method of claim 1, wherein the touch event is one of a sequence of touch events and each previously detected touch event in the sequence of touch events has a corresponding key area confirmed via the displaying of the key recognition item on the key area.

8. The method of claim 7, wherein the key recognition item displayed on the key area indicates the order in which the key area was touched in the sequence of touch events.

9. A key display apparatus comprising:
- a touch screen including a touch sensor configured to detect a touch event, and a display unit configured to display a key display area including at least one key area and a character display area for displaying a character mapped onto the key area according to a detected touch event; and
- a controller, in a character input mode, when a touch event is detected in the key display area through the touch screen, configured to confirm a key area in which the touch event is detected and configured to control the display unit to enable the display unit to display a key recognition item in the key area,
- wherein the controller controls the display unit to enable the display unit to display the key recognition item on the key area according to an order or a number of times that the touch event is detected.

10. The key display apparatus of claim 9, wherein the controller controls the display unit to enable the display unit to display at least one of a color varied item, a numeral item, and a block item on the key area.

11. The key display apparatus of claim 9, wherein the key recognition item is displayed such that the key recognition item is distinguished from other key areas of the key display area.

12. The key display apparatus of claim 9, wherein the controller, when the character input mode is a password input mode, controls the display unit to enable the display unit to display special characters as characters on the character display area.

13. The key display apparatus of claim 9, wherein the key area is mapped onto at least one of characters or numerals.

14. The key display apparatus of claim 9, wherein the character input mode is one of a message transmitting mode, a word-processing mode, a password input mode, and a searching mode.

15. A mobile terminal comprising:
- a display unit configured to display a screen including a character display area and a key display area having a plurality of key areas, each key area corresponding to a key;
- a touch screen coupled to the display unit configured to receive a touch input selecting one of the key areas; and
- a controller configured to identify a key area in which the touch input is detected by the touch screen, configured to control the display unit to display a character corresponding to the key area in the character display window, and configured to control the display unit to distinguish the key area from other key areas of the key display area,
- wherein the key area is distinguished from the other key areas of the key display area according to an order or a number of times of the detected touch input.

16. The mobile terminal of claim 15, wherein the controller controls the display unit to distinguish the key area by at least one of displaying the key area in a different color, displaying a numeral in the key area, displaying the key area as a block, and highlighting the key area.

17. The mobile terminal of claim 16, wherein, when the controller controls the display unit to display the key area in a different color, the controller controls the display unit to display the key area in a color corresponding to an order in which the touch input was detected in the key area.

18. The mobile terminal of claim 16, wherein, when the controller controls the display unit to display a numeral in the key area, the controller controls the display unit to display a number of times a touch input was detected in the key area.

\* \* \* \* \*